US012632059B2

(12) United States Patent
Nag

(10) Patent No.: US 12,632,059 B2
(45) **Date of Patent: *May 19, 2026**

(54) FRAMEWORK FOR VALIDATING AUTONOMY AND TELEOPERATIONS SYSTEMS

(71) Applicant: Nuro, Inc., Mountain View, CA (US)

(72) Inventor: Sreeja Nag, San Bruno, CA (US)

(73) Assignee: NURO, INC., Mountain View, CA (US)

( * ) Notice: Subject to any disclaimer, the term of this patent is extended or adjusted under 35 U.S.C. 154(b) by 105 days.

This patent is subject to a terminal disclaimer.

(21) Appl. No.: 18/535,472

(22) Filed: Dec. 11, 2023

(65) Prior Publication Data

US 2024/0134386 A1      Apr. 25, 2024

Related U.S. Application Data

(63) Continuation of application No. 17/385,367, filed on Jul. 26, 2021, now Pat. No. 11,892,838.

(Continued)

(51) Int. Cl.
*G05D 1/225*         (2024.01)
*G05D 1/247*         (2024.01)
(Continued)

(52) U.S. Cl.
CPC ............. *G05D 1/225* (2024.01); *G05D 1/247* (2024.01); *G05D 1/617* (2024.01); *G06F 30/20* (2020.01); *G06F 2111/02* (2020.01)

(58) Field of Classification Search
CPC .. G05D 1/0044; G05D 1/0214; G05D 1/0276; G06F 30/20; G06F 2111/02
(Continued)

(56) References Cited

U.S. PATENT DOCUMENTS

| | | |
|---|---|---|
| 1,022,450 A | 4/1912 | Waymoth |
| 10,222,228 B1 | 3/2019 | Chan et al. |
| | (Continued) | |

FOREIGN PATENT DOCUMENTS

WO         2020114785 A1      6/2020

OTHER PUBLICATIONS

Kalra, et al., "Driving to Safety—How Many Miles of Driving Would It Take to Demonstrate Autonomous Vehicle Reliability?," RAND Corporation, Transportation Research Part A: Policy and Practice, Dec. 1, 2016, vol. 94, 15 pages.
(Continued)

*Primary Examiner* — B M M Hannan
(74) *Attorney, Agent, or Firm* — Edell, Shapiro & Finnan, LLC

(57)         ABSTRACT

According to one aspect, methods to validate an autonomy system in conjunction with a teleoperations system are provided. A computing device obtains simulation data of an autonomous driving system of a vehicle. The simulation data includes first environment data representing an environment in which the vehicle is driven using the autonomous driving system. The computing device obtains teleoperations driving data of a teleoperations driving system by which the vehicle is remotely controlled with an aid of a human. The teleoperations driving data includes second environment data representing the environment in which the vehicle is driven using the teleoperations driving system. The computing device determines whether the autonomous driving system in conjunction with the teleoperations driving system meets a minimum deployment standard based on the simulation data and the teleoperations driving data.

20 Claims, 12 Drawing Sheets

Related U.S. Application Data

(60) Provisional application No. 63/056,957, filed on Jul. 27, 2020.

(51) Int. Cl.
*G05D 1/617* (2024.01)
*G06F 30/20* (2020.01)
*G06F 111/02* (2020.01)

(58) Field of Classification Search
USPC .......................... 701/2, 22–23, 27, 29.2–29.3
See application file for complete search history.

(56) References Cited

U.S. PATENT DOCUMENTS

| | | | |
|---|---|---|---|
| 10,693,208 B1 | 6/2020 | Tsironis | |
| 10,783,725 B1 | 9/2020 | Gaudin et al. | |
| 10,985,471 B2 | 4/2021 | Shiozaki et al. | |
| 11,022,450 B2 * | 6/2021 | Iagnemma | ........... G07C 5/0808 |
| 11,086,318 B1 | 8/2021 | Davis et al. | |
| 11,618,439 B2 | 4/2023 | Magzimof et al. | |
| 11,669,090 B2 | 6/2023 | Konrardy et al. | |
| 11,720,094 B2 | 8/2023 | Chen | |
| 11,740,624 B2 | 8/2023 | Ramamurthy et al. | |
| 11,814,059 B1 * | 11/2023 | Reschka | ............... B60W 40/09 |
| 2009/0276105 A1 | 11/2009 | Lacaze et al. | |
| 2018/0060467 A1 * | 3/2018 | Schulte | ............. B60W 30/0956 |
| 2019/0049948 A1 | 2/2019 | Patel et al. | |
| 2019/0186936 A1 | 6/2019 | Ebner et al. | |
| 2019/0369626 A1 | 12/2019 | Lui et al. | |
| 2020/0286309 A1 | 9/2020 | Chellapilla et al. | |
| 2021/0191403 A1 | 6/2021 | Rastoll et al. | |
| 2021/0224917 A1 * | 7/2021 | Gaudin | ................. B60W 40/09 |
| 2021/0341921 A1 * | 11/2021 | Davis | ................... G05D 1/0212 |
| 2023/0324188 A1 | 10/2023 | Tam et al. | |

OTHER PUBLICATIONS

Koopman, et al., "Toward a Framework for Highly Automated Vehicle Safety Validation," SAE Technical Paper 2018-01-1071, Apr. 2018, 13 pages.

* cited by examiner

900

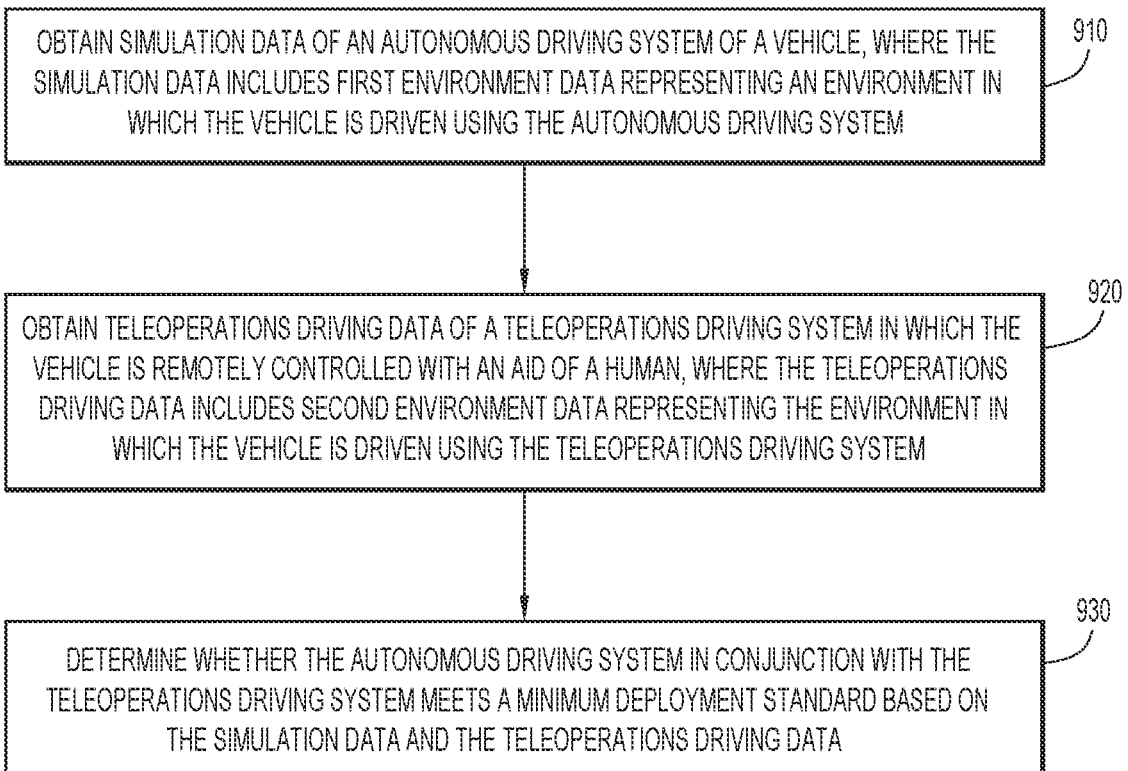

OBTAIN SIMULATION DATA OF AN AUTONOMOUS DRIVING SYSTEM OF A VEHICLE, WHERE THE SIMULATION DATA INCLUDES FIRST ENVIRONMENT DATA REPRESENTING AN ENVIRONMENT IN WHICH THE VEHICLE IS DRIVEN USING THE AUTONOMOUS DRIVING SYSTEM
910

OBTAIN TELEOPERATIONS DRIVING DATA OF A TELEOPERATIONS DRIVING SYSTEM IN WHICH THE VEHICLE IS REMOTELY CONTROLLED WITH AN AID OF A HUMAN, WHERE THE TELEOPERATIONS DRIVING DATA INCLUDES SECOND ENVIRONMENT DATA REPRESENTING THE ENVIRONMENT IN WHICH THE VEHICLE IS DRIVEN USING THE TELEOPERATIONS DRIVING SYSTEM
920

DETERMINE WHETHER THE AUTONOMOUS DRIVING SYSTEM IN CONJUNCTION WITH THE TELEOPERATIONS DRIVING SYSTEM MEETS A MINIMUM DEPLOYMENT STANDARD BASED ON THE SIMULATION DATA AND THE TELEOPERATIONS DRIVING DATA
930

FIG.9

FRAMEWORK FOR VALIDATING AUTONOMY AND TELEOPERATIONS SYSTEMS

CROSS-REFERENCE TO RELATED APPLICATION

This application is a continuation of U.S. patent application Ser. No. 17/385,367, filed Jul. 26, 2021, now U.S. Pat. No. 11,892,838, which claims priority to U.S. Provisional Application No. 63/056,957, filed Jul. 27, 2020, which are hereby incorporated by reference in their entireties.

TECHNICAL FIELD

The disclosure generally relates to autonomous vehicles, and more particularly, to assessing readiness for deployment of autonomous vehicles.

BACKGROUND

As the use of autonomous or self-driving vehicles grows, the need to accurately assess autonomous systems used to control the vehicles is becoming increasingly important. When autonomous systems are inaccurately assessed, vehicles using the autonomous systems may pose safety issues.

Simulations are often used to effectively test autonomous systems. The use of simulations allows an autonomous system to be tested over relatively long distances and in more situations than may be realistic for an autonomous system tested in an actual vehicle operating on roads. The ability to efficiently and effectively assess whether an autonomous system is considered to be safe for deployment with respect to a vehicle allows for prudent decisions to be made.

BRIEF DESCRIPTION OF THE DRAWINGS

FIG. 9 is a flow chart depicting, at a high-level, operations of determining whether an autonomous driving system in conjunction with a teleoperations driving system meets a minimum deployment standard, according to an example embodiment.

DESCRIPTION OF EXAMPLE EMBODIMENTS

Overview

Methods are provided to validate for deployment an autonomous system in conjunction with a teleoperations system.

In one embodiment, a computing device obtains simulation data of an autonomous driving system of a vehicle. The simulation data includes first environment data representing an environment in which the vehicle is driven using the autonomous driving system. The computing device obtains teleoperations driving data of a teleoperations driving system by which the vehicle is remotely controlled with an aid of a human. The teleoperations driving data includes second environment data representing the environment in which the vehicle is driven using the teleoperations driving system. The computing device determines whether the autonomous driving system in conjunction with the teleoperations driving system meets a minimum deployment standard based on the simulation data and the teleoperations driving data.

Example Embodiments

To assess the readiness of autonomy systems for deployment, e.g., in autonomous vehicles, metrics involving distances driven are typically used. That is, distance-based metrics are often used to determine whether an autonomy system meets predetermined standards and is, hence, ready to be safely deployed.

Many autonomous vehicles may be operated, at least some of the time, using a teleoperations system. That is, an autonomous vehicle may be operated remotely. For autonomous vehicles that may be teleoperated at least some of the time, determining whether an autonomous vehicle may be deployed safely includes assessing the teleoperations system.

In some instances, an autonomy system may be determined not to strictly meet predetermined standards for safety. For example, an autonomy system tested in simulation may be determined to result in more bad behavior and/or collisions than desired. Bad behavior and/or collisions are some examples of a negative event. A negative event is a behavior event that causes a hazard or a loss such as a near miss, a collision, jumping a curb, breaking a traffic law, etc. One or more negative events may be user-defined and may be grouped into various categories. Even when an autonomy system may be determined not to strictly meet predetermined standards for safety, it may be possible that the use of a teleoperations system in conjunction with the autonomy system may meet or exceed the predetermined standards for safety. That is, a teleoperations system may take over for an autonomy system in some situations, and thereby potentially mitigate issues associated with negative events such as avoid breaking the traffic law, a near miss or a collision. When a vehicle is capable of operating using an autonomy system that is substantially backed-up by a teleoperations system, the autonomy system may be determined to be safe for deployment if an overall system which includes the autonomy system and the teleoperations system meets or exceeds predetermined standards for safety.

Figure 1:
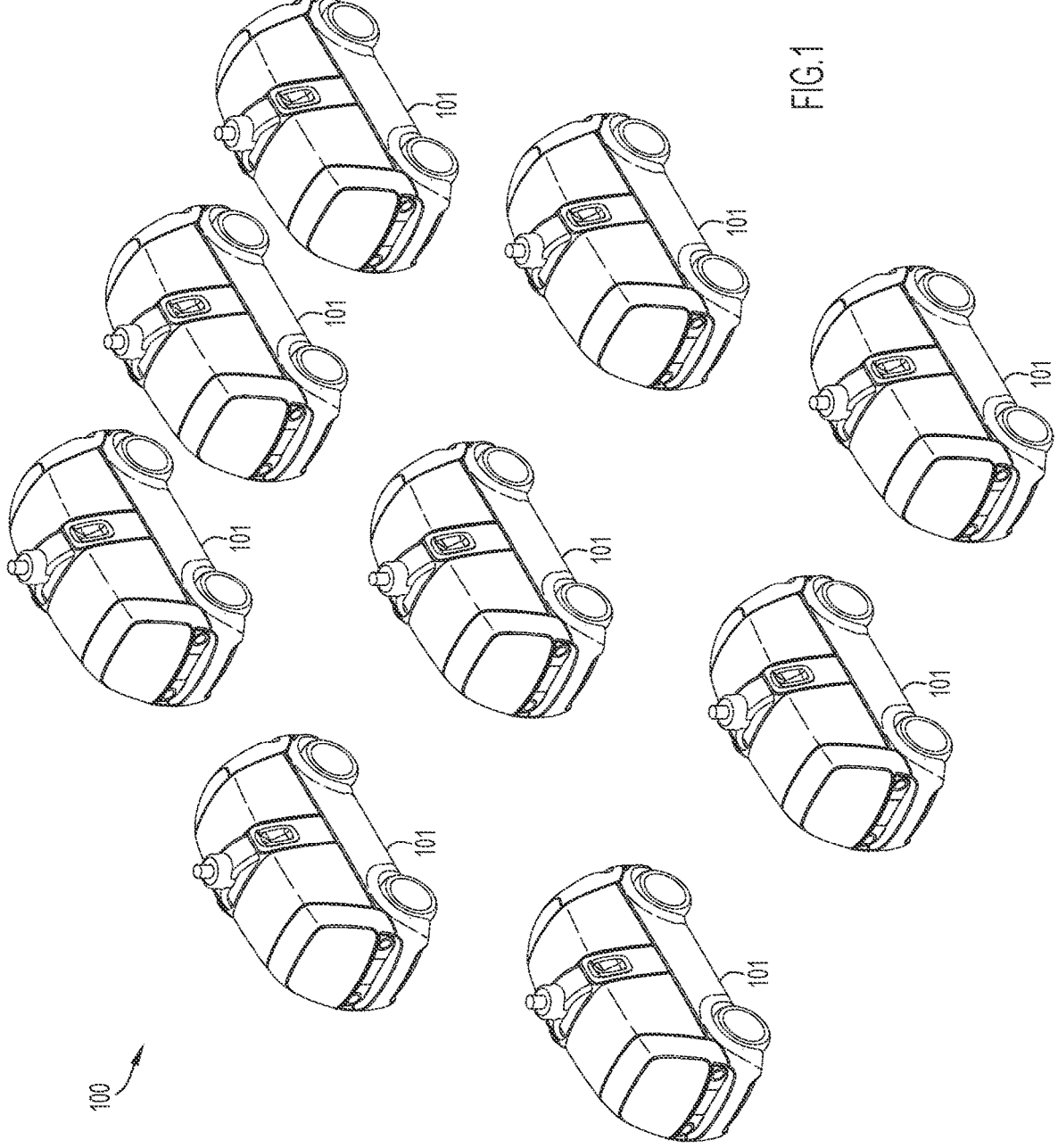
FIG. 1 is a diagram of an autonomous vehicle fleet in which an autonomy system is validated in conjunction with a teleoperations system, according to an example embodiment.

Autonomy systems, as well as teleoperations systems, are often used to facilitate the operation of vehicle fleets. Referring initially to FIG. 1, an autonomous vehicle fleet will be described in accordance with an embodiment. An autonomous vehicle fleet (fleet) 100 includes a plurality of autonomous vehicles 101, or robot vehicles. Autonomous vehicles 101 are generally arranged to transport and/or to deliver cargo, items, and/or goods. Autonomous vehicles 101 may be fully autonomous and/or semi-autonomous vehicles. In general, each autonomous vehicle 101 may be a vehicle that is capable of travelling in a controlled manner for a period of time without intervention, e.g., without human intervention. As will be discussed in more detail below, each autonomous vehicle 101 may include a power system, a propulsion or conveyance system, a navigation module, a control system or controller, a communications system, a processor, and a sensor system.

Dispatching of autonomous vehicles 101 in fleet 100 may be coordinated by a fleet management module (not shown). The fleet management module may dispatch autonomous vehicles 101 for purposes of transporting, delivering, and/or retrieving goods or services in an unstructured open environment or a closed environment.

Figure 2:
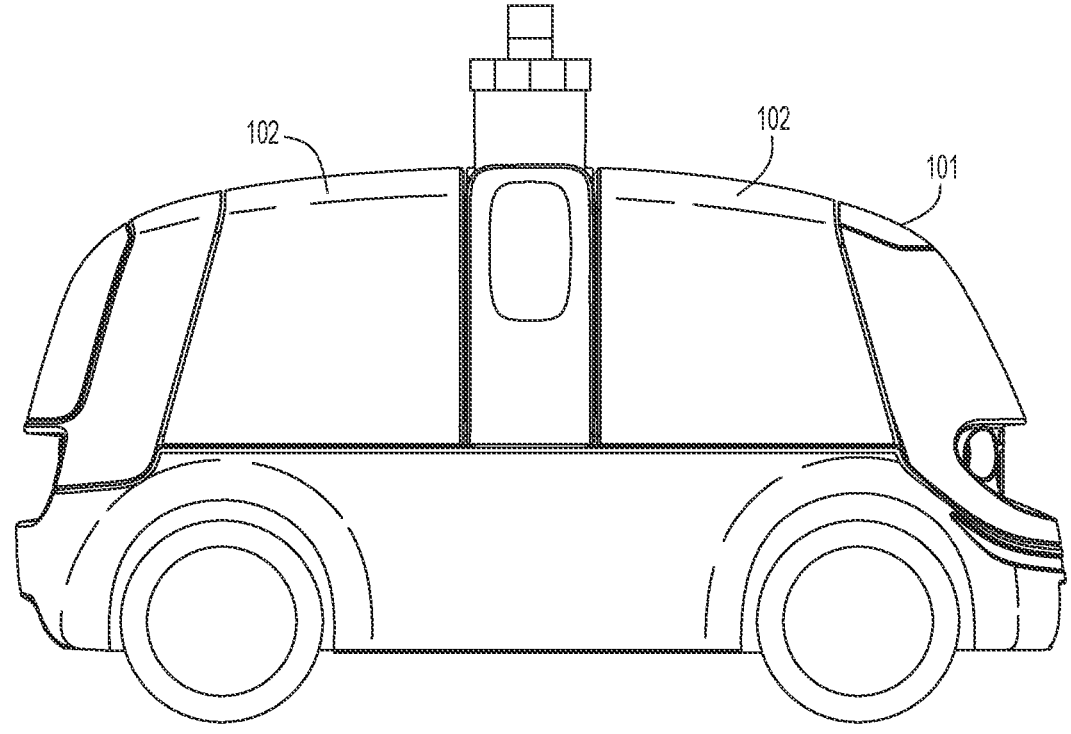
FIG. 2 is a diagram of an autonomous vehicle in which an autonomy system is validated in conjunction with a teleoperations system, according to an example embodiment.

FIG. 2 is a diagram of an autonomous vehicle, e.g., one of autonomous vehicles 101 of FIG. 1, in accordance with an embodiment. Autonomous vehicle 101, as shown, is a vehicle configured for land travel. Typically, autonomous vehicle 101 includes physical vehicle components such as a body or a chassis, as well as conveyance mechanisms, e.g., wheels. In one embodiment, autonomous vehicle 101 may be relatively narrow, e.g., approximately two to approximately five feet wide, and may have a relatively low mass and relatively low center of gravity for stability. Autonomous vehicle 101 may be arranged to have a working speed or velocity range of between approximately one and approximately forty-five miles per hour (mph), e.g., approximately twenty-five miles per hour. In some embodiments, autonomous vehicle 101 may have a substantially maximum speed or velocity in range between approximately thirty and approximately ninety mph.

Autonomous vehicle 101 includes a plurality of compartments 102. Compartments 102 may be assigned to one or more entities, such as one or more customer, retailers, and/or vendors. Compartments 102 are generally arranged to contain cargo, items, and/or goods. Typically, compartments 102 may be secure compartments. It should be appreciated that the number of compartments 102 may vary. That is, although two compartments 102 are shown, autonomous vehicle 101 is not limited to including two compartments 102.

Figure 3:
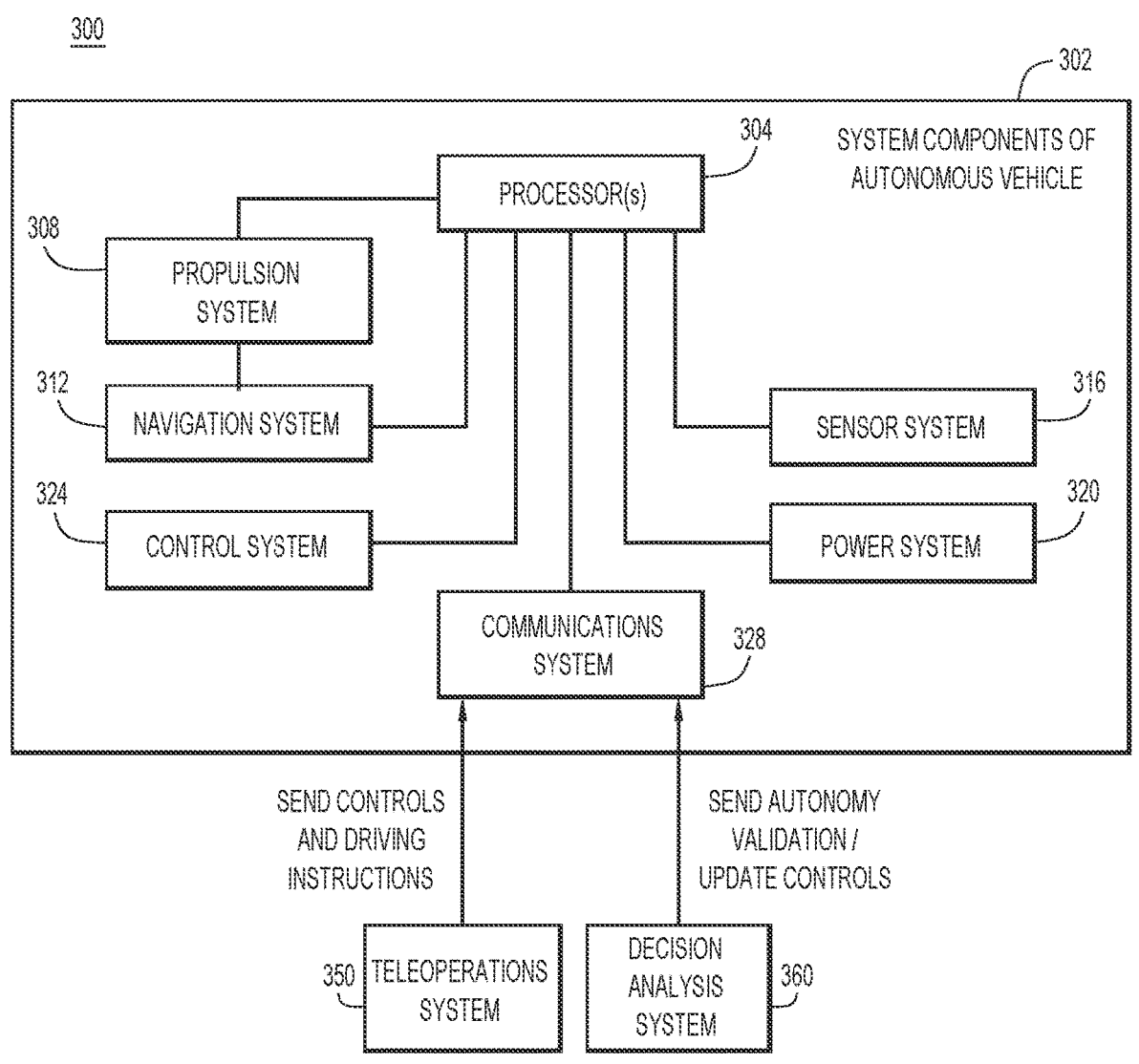
FIG. 3 is a block diagram of a system that includes a decision analysis system, a teleoperations system, and components of an autonomous vehicle, according to an example embodiment.

FIG. 3 is a block diagram of a system 300 that includes system components 302 of an autonomous vehicle, e.g., autonomous vehicle 101 of FIG. 1, a teleoperations system 350, and a decision analysis system 360, in accordance with an example embodiment. The teleoperations system 350 and the decision analysis system 360 may include one or more servers and/or computing devices.

The system components 302 of an autonomous vehicle 101 include a processor 304, a propulsion system 308, a navigation system 312, a sensor system 316, a power system 320, a control system 324, and a communications system 328. It should be appreciated that processor 304, propulsion system 308, navigation system 312, sensor system 316, power system 320, and communications system 328 may be coupled or mounted to a chassis or body of autonomous vehicle 101.

Processor 304 is arranged to send instructions to and to receive instructions from or for various components such as propulsion system 308, navigation system 312, sensor system 316, power system 320, and control system 324. Propulsion system 308, or a conveyance system, is arranged to cause autonomous vehicle 101 to move, e.g., drive. For example, when autonomous vehicle 101 is configured with a multi-wheeled automotive configuration as well as steering, braking systems and an engine, propulsion system 308 may be arranged to cause the engine, wheels, steering, and braking systems to cooperate to drive. In general, propulsion system 308 may be configured as a drive system with a propulsion engine, wheels, treads, wings, rotors, blowers, rockets, propellers, brakes, etc. The propulsion engine may be a gas engine, a turbine engine, an electric motor, and/or a hybrid gas and electric engine.

Navigation system 312 may control propulsion system 308 to navigate autonomous vehicle 101 through paths and/or within unstructured open or closed environments. Navigation system 312 may include at least one of digital maps, street view photographs, and a global positioning system (GPS) point. Maps, for example, may be utilized in cooperation with sensors included in sensor system 316 to allow navigation system 312 to cause autonomous vehicle 101 to navigate through an environment.

Sensor system 316 includes any sensors, as for example LiDAR, radar, ultrasonic sensors, microphones, altimeters, and/or cameras. Sensor system 316 generally includes onboard sensors, which allow autonomous vehicle 101 to safely navigate, and to ascertain when there are objects near autonomous vehicle 101. In one embodiment, sensor system 316 may include propulsion systems sensors that monitor drive mechanism performance, drive train performance, and/or power system levels.

Power system 320 is arranged to provide power to autonomous vehicle 101. Power may be provided as electrical power, gas power, or any other suitable power, e.g., solar power or battery power. In one embodiment, power system 320 may include a main power source, and an auxiliary power source that may serve to power various components of autonomous vehicle 101 and/or to generally provide power to autonomous vehicle 101 when the main power source does not have the capacity to provide sufficient power.

Communications system 328 allows autonomous vehicle 101 to communicate, as for example, wirelessly, with a fleet management system (not shown) that allows autonomous vehicle 101 to be controlled remotely. Communications system 328 generally obtains or receives data, stores the data, and transmits or provides the data to a fleet management system and/or to autonomous vehicles 101 within a fleet 100. The data may include, but is not limited to including, information relating to scheduled requests or orders, information relating to on-demand requests or orders, and/or information relating to a need for autonomous vehicle 101 to reposition itself, e.g., in response to an anticipated demand.

In some embodiments, communications system 328 may communicate, e.g., wirelessly, with the teleoperations system 350 that is configured to remotely operate autonomous vehicle 101. For example, communications system 328 may send or otherwise provide data from sensor system 316 to the teleoperations system 350, and/or receive or otherwise obtain data such as controls and driving instructions, from the teleoperations system 350, for use by the propulsion system 308.

In some embodiments, the communications system 328 may further be configured to communicate with the decision analysis system 360. The communications system 328 may provide simulation data, described below, to a validation system, described below and/or receive autonomy validation and update controls from the decision analysis system 360. The decision analysis system 360 may indicate that the autonomous driving system of the autonomous vehicle 101 in conjunction with the teleoperations system 350 is ready for deployment. Communications supported by communications system 328 may include, but are not limited to including, cellular communications such as 3G/4G/5G and/or LTE communications and other network communications, e.g., Wi-Fi® or Bluetooth® wireless communication techniques.

In some embodiments, control system 324 may cooperate with processor 304 to determine where autonomous vehicle 101 may safely travel, and to determine the presence of objects in a vicinity around autonomous vehicle 101 based on data, e.g., results, from sensor system 316. In other words, control system 324 may cooperate with processor 304 to effectively determine what autonomous vehicle 101 may do within its immediate surroundings. Control system 324 in cooperation with processor 304 may essentially control power system 320 and navigation system 312 as part of driving or conveying autonomous vehicle 101. Additionally, control system 324 may cooperate with processor 304 and communications system 328 to provide data to or obtain data from other autonomous vehicles 101, a management server such as the decision analysis system 360, a global positioning server (GPS), a personal computer, the teleoperations system 350, a smartphone, or any computing device via the communications system 328.

In general, control system 324 may cooperate at least with processor 304, propulsion system 308, navigation system 312, sensor system 316, and power system 320 to allow autonomous vehicle 101 to operate autonomously. That is, autonomous vehicle 101 is able to operate autonomously using an autonomy system that effectively includes, at least in part, functionality provided by propulsion system 308, navigation system 312, sensor system 316, power system 320, and control system 324.

As will be appreciated by those skilled in the art, when autonomous vehicle 101 operates autonomously, the autonomous vehicle 101 may generally operate, e.g., drive, under the control of an autonomy system. That is, when autonomous vehicle 101 is in an autonomous mode, autonomous vehicle 101 is able to generally operate without a driver or a remote operator controlling autonomous vehicle, as for example using a teleoperations system 350. In one embodiment, autonomous vehicle 101 may operate in a semi-autonomous mode or a fully autonomous mode. When autonomous vehicle 101 operates in a semi-autonomous mode, autonomous vehicle 101 may operate autonomously at times and may operate under the control of a driver or a remote operator via teleoperations system 350, at other times. When autonomous vehicle 101 operates in a fully autonomous mode, autonomous vehicle 101 typically operates substantially only under the control of an autonomy system. The ability of an autonomous system to collect information and extract relevant knowledge from the environment provides autonomous vehicle 101 with perception capabilities. For example, data or information obtained from sensor system 316 may be processed such that the environment around autonomous vehicle 101 may effectively be perceived.

The decision analysis system 360 is configured to determine whether the autonomy system of the autonomous vehicle is ready for deployment and communicate the same to the communications system 328. The decision analysis system 360 may communicate with other devices and entities to determine whether the autonomy system of the autonomous vehicle alone is ready for deployment and/or whether the autonomy system in conjunction with the teleoperations system 350 is ready for deployment.

Simulation systems may generally be used to validate autonomy systems. A simulation system may simulate the behavior of an autonomy system across a multitude of different real-world scenes, scenarios, and/or situations. That is, a simulation system allows different autonomy-related algorithms to be tested with different real-world driving scenes to substantially ensure that once the autonomy system is deployed on a vehicle, the vehicle may operate safely and reliably. A relatively large number of different scenes, scenarios, and/or situations may be tested. Such scenes, scenarios, and/or situations may include, but are not limited to including, different roads, different driving conditions, different traffic conditions, different obstacles, etc.

When a simulation system indicates that an autonomy system meets specifications, e.g., meets at least a predetermined threshold for safety, then the indication may be that the autonomy system may be safely deployed on a vehicle. Safety may be quantified as a function of the expected occurrence rate of negative events such as collisions or miles per collision, that are estimated using a statistical framework on past miles driven and negative events observed in on-road operations and in simulations. In one embodiment, if the simulation system indicates that an autonomy system does not meet specifications, then an assessment may be made as to whether the use of a teleoperations system 350 in conjunction with the autonomy system would likely render the autonomy system to effectively be ready for safe deployment. That is, if an autonomy system assisted by a teleoperations system 350 is determined to meet at least a predetermined threshold for safety, then an overall system that includes the autonomy system and the teleoperations system 350 may be determined to be sufficient for safe deployment on a vehicle.

In one embodiment, a comparison may be made between a simulation of an autonomy system and a simulation of the autonomy system with a teleoperations system 350 as "backup." The simulation of the autonomy system with the teleoperations system 350 as a backup, e.g., an extra safety measure, may include using the teleoperations system 350 to navigate particular scenes from the simulation of the autonomy system. For example, a scene in the simulation, which may have caused a negative event, may be substantially presented using the teleoperations system 350 to determine how a remote driver may have reacted, and whether the remote driver may have successfully taken over during the negative event.

A teleoperations system 350 may include a simulation feature, or an ability for a human driver to effectively drive a vehicle in a simulated scene or scenario. A teleoperations system 350 may additionally, or alternatively, be configured for a human driver to remotely operate a physical vehicle through an actual scene or scenario.

A simulation of an autonomy system may enable a significant number of miles to be tested, e.g., enough miles to allow for an acceptable number of anticipated miles per negative event (MPNE). While it is generally not practical to test the same number of miles using the teleoperations system 350, a smaller number of miles driven may be determined to be sufficient to effectively provide a validation that an autonomy system backed up by the teleoperations system 350 may meet a predetermined safety standard or threshold. In other words, a subset of the number of miles effectively driven by an autonomy system in simulation may be driven by a human operator using the teleoperations system 350, and that subset of the number of miles may be used to substantially validate that the autonomy system in conjunction with the teleoperations system 350 would enable a vehicle to operate autonomously while meeting predetermined safety standards. The appropriate subset may be determined as a function of frequency and nature of AV on-road driving data when teleoperations system 350 disengaged autonomy such events can be re-created in the teleoperations simulators, in closed course testing, and even structured testing in on-road teleoperations with a safety in-car driver.

In one embodiment, an upper bound on a number of negative events per disengaged scene may be substantially set as a function of negative events experienced using an autonomy system alone in any given miles of exposure and a number disengagements in teleoperations in that exposure, i.e., negative events per disengage (NEPD). A frequency of disengagements in teleoperations may be quantified as the number of miles of exposure and the average miles per autonomy-system-to-teleoperations-system disengagement, or miles per disengagement (MPD).

Figure 4A:
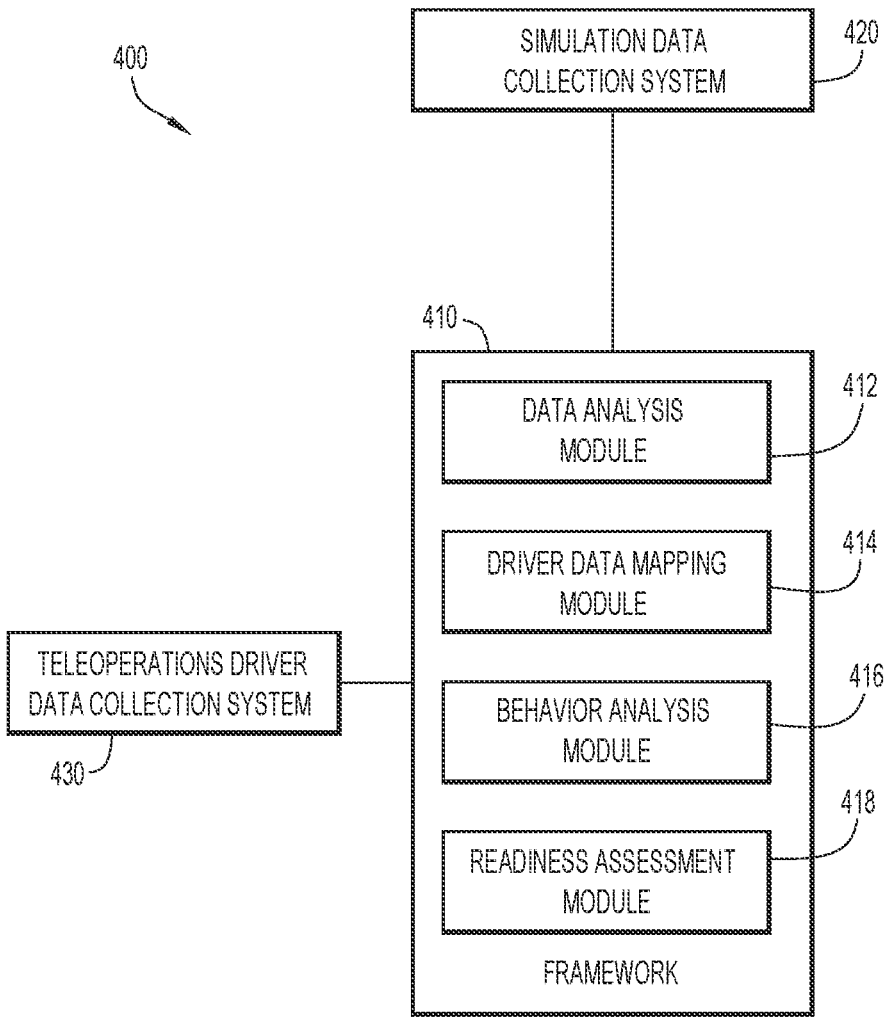
FIG. 4A is a block diagram of a framework system that is configured to validate an autonomy system in conjunction with a teleoperations system, according to an example embodiment.

Referring next to FIG. 4A, a framework system 400 is described that is configured to validate an autonomy system in conjunction with the teleoperations system 350 of FIG. 3, according to an example embodiment. The framework system 400 includes a framework 410, a simulation data collection system 420, and a teleoperations driver data collection system 430. The framework system 400 may include a number of computing devices and/or servers. In one example embodiment, the framework system 400 may be integrated into the decision analysis system 360 of FIG. 3.

The framework 410 is a set of functional modules arranged to effectively validate or to otherwise assess the safety of an autonomy system simulated using simulation data collection system 420 in conjunction with a teleoperations system 350 (FIG. 3) that is effectively implemented using teleoperations driver data collection system 430. The framework 410 is configured to assess whether a combination of an autonomy system simulated using simulation data collection system 420 and a teleoperations system 350 that is effectively implemented using the teleoperations driver data collection system 430 meets predetermined safety standards or thresholds relating to the deployment of an autonomous vehicle.

The framework 410, which may be implemented as software, hardware, and/or firmware on one or more server systems, e.g., computing systems, is generally configured to process data from the simulation data collection system 420 and the data from teleoperations driver data collection system 430 to determine whether an autonomy system, when used in cooperation with a teleoperations system 350, would be sufficient to meet predetermined safety standards or thresholds for the deployment of an autonomous vehicle. The framework 410 includes a data analysis module 412, a driver data mapping module 414, a behavior analysis module 416, and a readiness assessment module 418.

The data analysis module 412 is generally arranged to analyze data to determine whether data indicates that an autonomy system, for example, would meet predetermined safety standards on its own. In one embodiment, the data analysis module 412 may reduce data obtained from simulation data collection system 420 to determine whether or not the data meets MPNE parameters that are defined to ensure that an autonomy system is ready for safe deployment. As previously mentioned, in the event that data relating to an autonomy system does not meet a predetermined safety standard or threshold, additional analysis may be performed to ascertain whether the autonomy system, when used in conjunction with a teleoperations system, would meet a predetermined safety standard or threshold.

The driver data mapping module 414 is configured to determine how much data may need to be collected using the teleoperations driver data collection system 430 to validate or to otherwise assess whether an autonomy system used in conjunction with a teleoperations system effectively meets a predetermined safety standard or threshold. In one embodiment, the driver data mapping module 414 is configured to determine how many miles are to be driven using a teleoperations system such that situational awareness and behavior may be accurately assessed. It should be appreciated that the miles driven via the teleoperations system may be actual, on road miles driven using a teleoperations system, or effectively driven using a teleoperations system in simulation, or a simulated teleoperations system.

The framework 410 may generally communicate with the teleoperations driver data collection system 430 to provide information relating to how many miles a human driver is to drive, either in simulation or on a road using teleoperations system, in order to validate the behavior of the human driver and to substantially merge the performance of the human driver with results from simulation data collection system 420 such that overall system requirements, e.g., safety gates or thresholds, may be met.

The behavior analysis module 416 is configured to analyze the behavior of a driver based on data obtained from the teleoperations driver data collection system 430. In one embodiment, both a situational awareness and a behavioral reaction to the situational awareness may be analyzed or otherwise assessed.

The readiness assessment module 418 is configured to ascertain whether an autonomy system that is effectively evaluated in simulation and a teleoperations system, together, would allow an autonomous vehicle to be deployed safely, i.e., such that predetermined safety standards or thresholds are met. The readiness assessment module 418 may evaluate scenes that a driver has failed to navigate safely, and may estimate a probability that teleoperations may be unsuccessful at navigating a scene while an autonomy system may navigate the scene safely.

The simulation data collection system 420 may generally include any simulation system that is configured to allow an autonomy system, e.g., autonomy software and/or hardware, to essentially be utilized within a simulated environment such that data relating to the autonomy system may be collected. The simulated environment generally includes scenes, scenarios, and/or situations, which may be encountered by an autonomy system deployed on an actual vehicle such as the autonomous vehicle 101. The use of simulation data collection system 420 allows a relatively high number of simulations to be run and, hence, allows for comprehensive testing of an autonomy system.

The teleoperations driver data collection system 430 is generally any suitable system, which collects data as a human driver drives or otherwise operates a vehicle either in simulation or in reality. For example, the teleoperations driver data collection system 430 may collect data as a human driver uses a teleoperation system to remotely operate an actual vehicle or the autonomy system.

Figure 4B:
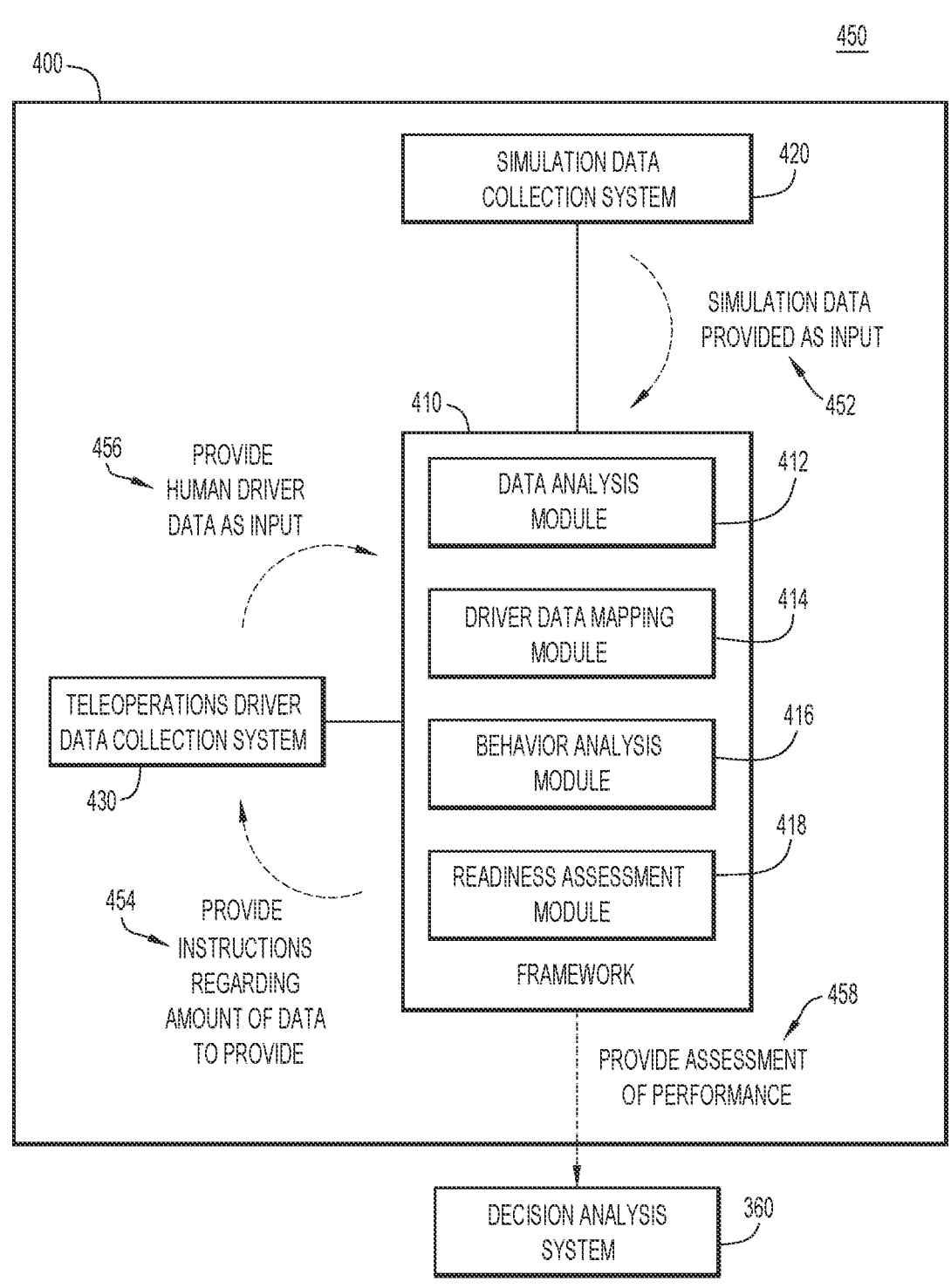
FIG. 4B is a flow diagram depicting operations of the framework system of FIG. 4A in communication with the decision analysis system of FIG. 3 to validate an autonomy system in conjunction with a teleoperations system, according to an example embodiment.

Reference is now made to FIG. 4B. FIG. 4B is a flow diagram depicting operations of an overall system 450, according to an example embodiment. The overall system 450 includes the framework system 400 of FIG. 4A configured to validate an autonomy system in conjunction with a teleoperations system and is in communication with the decision analysis system 360 of FIG. 3.

Specifically, the results provided by the framework system 400 may be assessed by the decision analysis system 360 to determine whether or not to deploy on roads a vehicle, which utilizes an autonomy system that is effectively backed up by a teleoperations system. In one embodiment, even if the framework system 400 determines that safety standards are met by a combination of an autonomy system and a teleoperations system, the decision analysis system 360 may determine that an autonomous vehicle is not ready for deployment.

At 452, the simulation data collection system 420 may generally provide data as input into the framework 410, which then processes the data. The data analysis module 412 determines how frequently the autonomy system disengages e.g., MPD. Once the data analysis module 412 processes the data and determines the MPD, the driver data mapping module 414 determines how much data is effectively desired from teleoperations driver data collection system 430. For example, the driver data mapping module 414 may determine data needed from the teleoperations driver data collection system 430 for the scenarios of disengagement of the autonomy system. At 454, the framework 410 provides instructions to the teleoperations driver data collection system 430, either directly or indirectly, which effectively specifies the amount of data the framework 410 expects to be provided.

At 456, an appropriate, e.g., requested, amount of human driver data is provided by teleoperations driver data collection system 430 to framework 410. The behavior analysis module 416 then assesses the human driver data and the simulation data. That is, the framework 410 takes input data and provides a performance assessment relating to whether the input data indicates that a safety gate or threshold may be met using an autonomy system in conjunction with a teleoperations system. At 458, the performance assessment is provided by the readiness assessment module 418 to the decision analysis system 360.

Figure 5A:
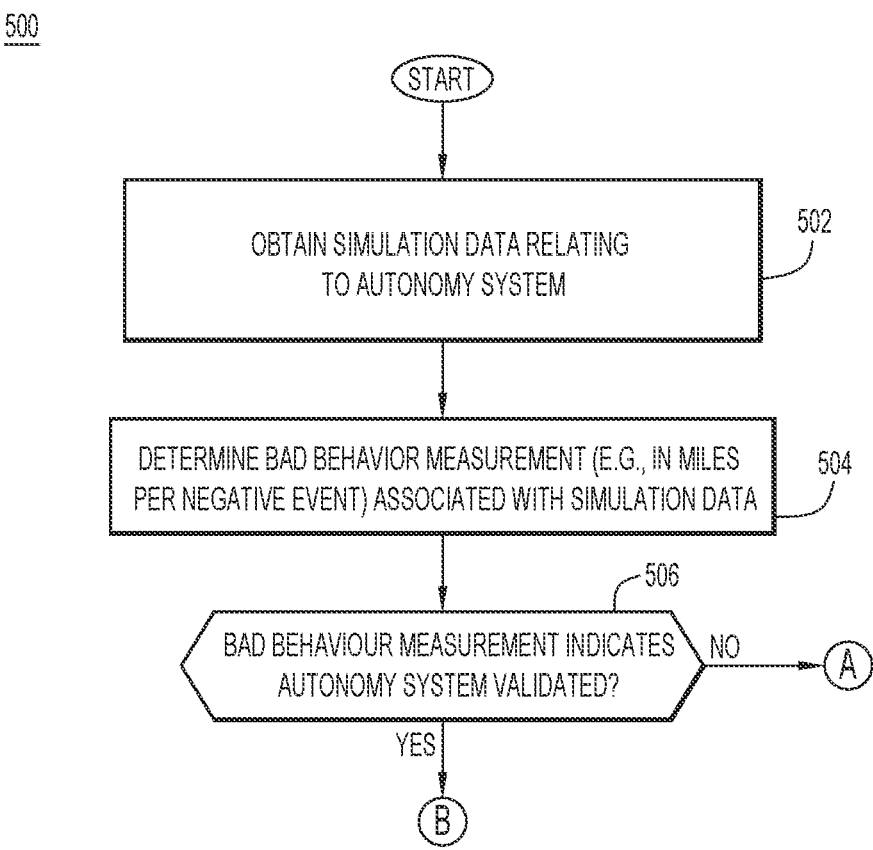
FIGS. 5A and 5B are flow charts illustrating a method of processing collected data to substantially benchmark an autonomous system and a teleoperations system, according to an example embodiment.
Figure 5B:
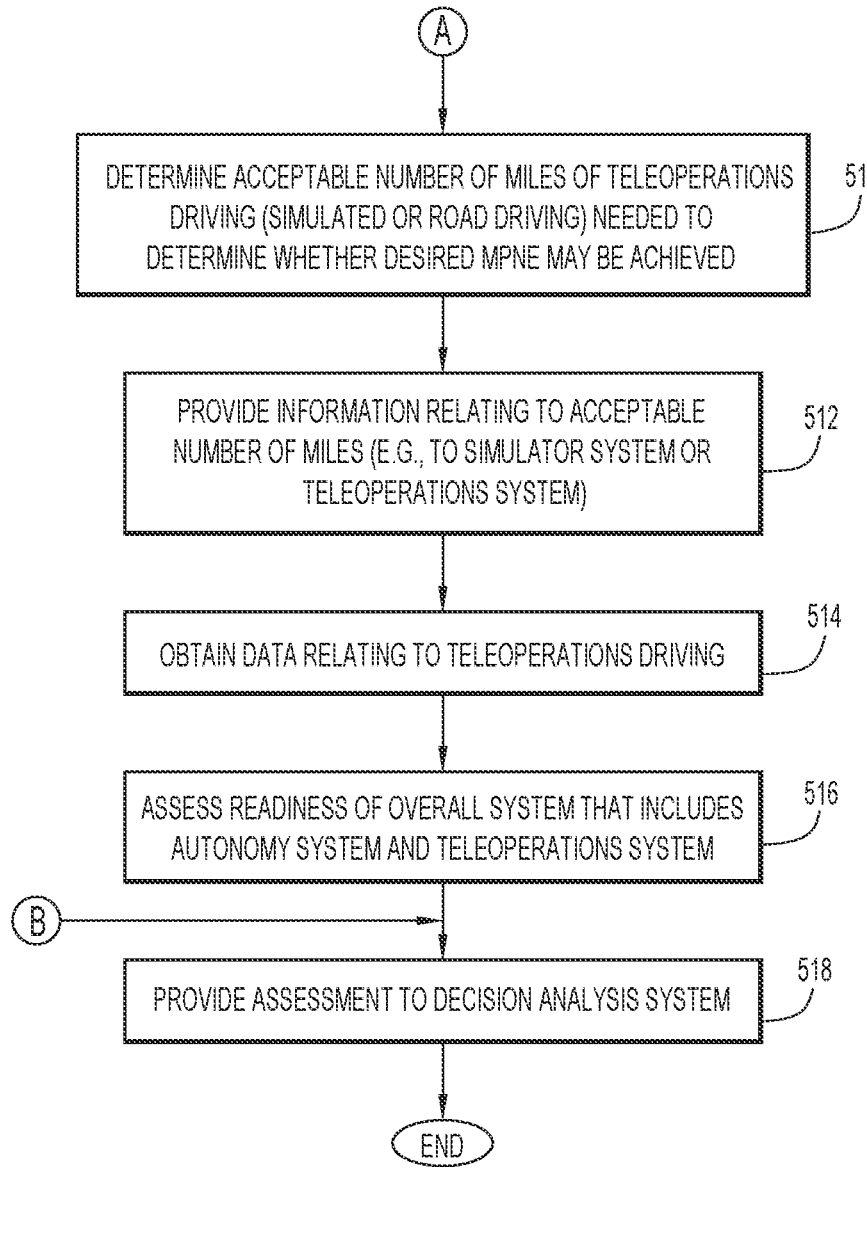

FIGS. 5A and 5B are flow charts illustrating a method 500 of processing collected data to substantially benchmark an autonomous system and a teleoperations system, e.g., to determine whether an autonomous system used in conjunction with teleoperations system may meet predetermined safety standards or thresholds, in accordance with an example embodiment. The method 500 of processing collected data begins at step 502 in which the simulation data relating to an autonomy system is obtained, as for example, by a computing system associated with the framework 410 of FIGS. 4A and 4B. The simulation data may be obtained from a simulation data collection system 420, and may be obtained substantially in real-time, or periodically, e.g., after a certain number of simulated miles are completed.

At step 504, a bad behavior measurement associated with the simulation data relating to an autonomy system is determined. The bad behavior measurement may be any suitable measurement or parameter including, but not limited to, a measurement relating to the MPD and/or the MPNE.

At step 506, a determination is made as to whether the bad behavior measurement indicates that the autonomy system is validated, or otherwise meets predetermined safety standards or thresholds. If the determination is that the bad behavior measurement indicates that the autonomy system is not validated, then the method 500 proceeds to step 510 in FIG. 5B.

At step 510, an acceptable number of miles of human driving, either simulated or on road, is determined. The number of miles of human driving may, in one embodiment, be an amount that is appropriate to determine whether a desired MPNE may be achieved for an overall arrangement that includes autonomy system and a teleoperations system that are used in conjunction with one another. The acceptable number of miles may be any number of miles, e.g., a minimum number of miles, and may be determined using any suitable method.

For example, the computing system obtains human driving data such as number of hours, number of miles, and number of negative events encountered and calculates an event rate per a measure of human driving (a rate-based metric, such as distance or time from sources such as naturalistic driving databases). The computing system further obtains AV driving data, which is based on the autonomy system and includes number of hours, number of miles, number of events. The computing system then computes the negative event rate for the autonomy system only.

The event rate per human driving is then compared to the negative event rate of the autonomous system. The comparison may include rates using comparison of statistical distributions and not just medians or variances. The output of the comparison indicates that confidence of one distribution being higher than the confidence of the other distribution. If the output indicates that the autonomous system's negative event rate is not sufficiently lower than event rate per human driving, a teleoperations assisted autonomous system is considered. The combined performance is evaluated using conditional probability and statistical analysis. A chain rule for more than one disengage may be included, such as if hardware fails, the simulation is not captured/excluded.

At step 512, information relating to the acceptable number of miles of human driving may be provided to a driving simulator system or a teleoperations system. Generally, the information is provided through a network, e.g., a wireless network.

Once the information is provided to the driving simulator system or the teleoperations system, a human driver may use the simulator system or the teleoperations system, and data relating to human driving may be obtained, e.g., by the computing system of framework, at step 514. The readiness of the overall autonomy/teleoperations system which includes an autonomy system and a teleoperations system may be assessed, at step 516. Assessing the readiness of the overall system for deployment may include, but is not limited to, determining whether the autonomy system operating in conjunction with the teleoperations system would likely meet a desired benchmark, such as a desired MPNE.

One method of assessing readiness of the overall autonomy/teleoperations system will be discussed below with reference to FIG. 6.

After the readiness of the overall autonomy/teleoperations system is assessed, the assessment is provided to a decision analysis system, at step 518. In one embodiment, the decision analysis system may implement algorithms and the like to substantially ascertain whether a teleoperations system may effectively augment an autonomy system such that an overall autonomy/teleoperations system is deemed to meet safety standards and, hence, render a vehicle that uses the overall autonomy/teleoperations system to be safe for deployment. Upon providing an assessment to the decision analysis system, the method of processing collected data is completed.

Returning to step 506 of FIG. 5A, the determination of whether the collision measurement indicates that an autonomy system is validated, if the determination is that the autonomy system is validated, the method proceeds to step 518 in which an assessment is provided to a decision analysis system at step 518, as shown in FIG. 5B. The assessment may be that the autonomy system, used substantially without a teleoperations system, meets predetermined safety standards or thresholds.

Figure 6:
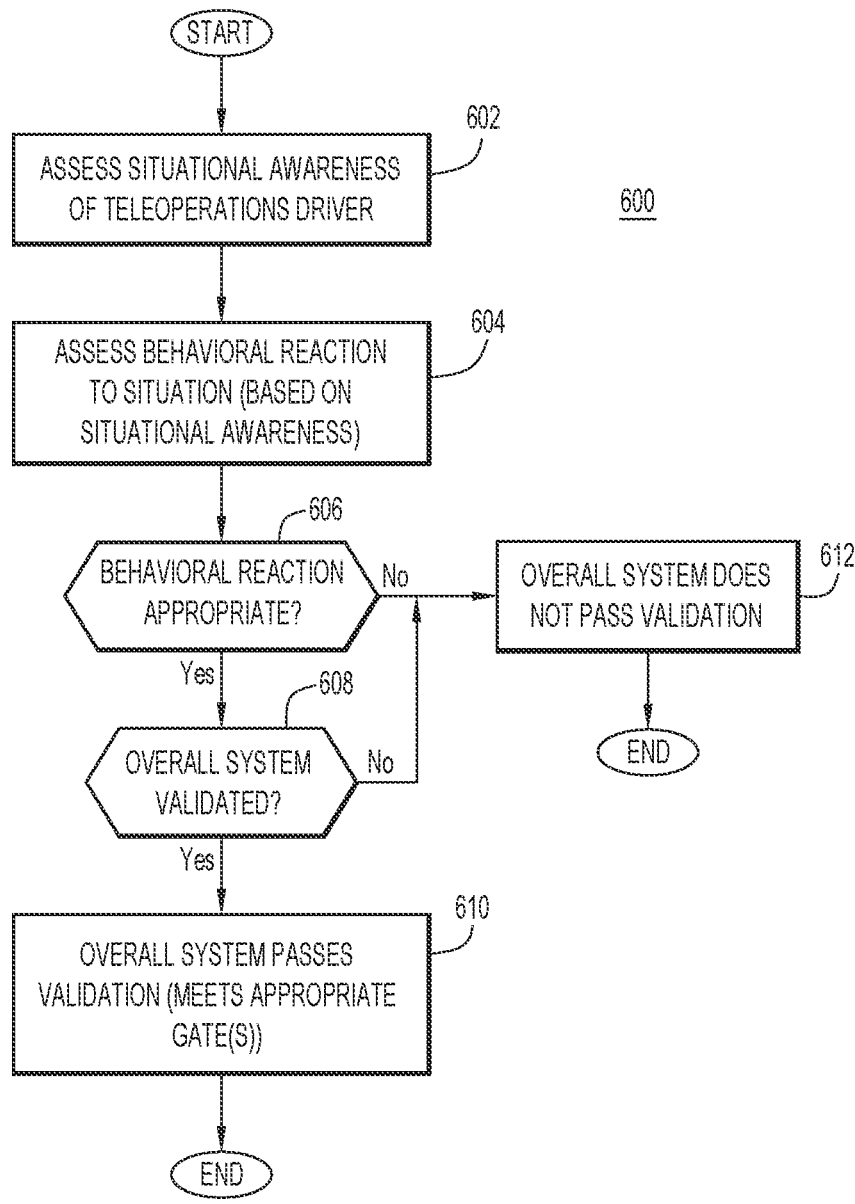
FIG. 6 is a flow chart illustrating a method of assessing readiness of an overall system that includes an autonomy system and a teleoperations system, according to an example embodiment.

FIG. 6 is a flow chart illustrating a method 600 of assessing the readiness of an overall autonomy/teleoperations system, e.g., operation or step 516 of FIG. 5B, in accordance with an example embodiment. The method 600 of assessing the readiness of an overall autonomy/teleoperations system begins at step 602, in which the situational awareness of a human driver is assessed.

At step 604, the behavioral reaction of the human driver to a situation is assessed. For example, for a situation in which an autonomy system would be likely to disengage, it is determined whether the human driver recognizes the situation as one for which he/she should take evasive action.

At step 606, a determination is made as to whether the behavioral reaction at 604 is appropriate. If the determination is that the behavioral reaction is appropriate, the indication is that the human driver acted in an acceptable, or reasonable, manner in response to the situation. For example, the human driver perceived the hazard and avoided a collision, jumping a curb, and so on. That is, an appropriate behavior is exhibited in response to the situation. Accordingly, the method 600 proceeds to step 608 in which it is determined whether the overall autonomy/teleoperations system may be considered to be validated. It should be appreciated that such a determination may include, but is not limited to including, a comparison of one or more behavioral reactions to relevant gates or thresholds. For example, there is a pass/fail criterion to determine if the behavioral reaction is appropriate. Based on the foregoing, the NEPD rate is determined. In one example, the NEPD of teleoperations system may be the probability of teleoperation system encountering the negative event after the autonomy system is disengaged. It is combined with miles per negative event (MPNE) and MPD (frequency at which the teleoperation systems disengages the autonomous system and drives) using a Bayesian inference statistical framework to output the overall MPNE. Occurrence of events can be represented by appropriate distributions such as a Poisson distribution.

If the determination is that the overall autonomy/teleoperations system is validated at step 608, then the overall autonomy/teleoperations system is considered as a passing validation e.g., meets appropriate gates or standards, at 610.

The method 600 of assessing readiness is completed once the overall autonomy/teleoperations system is determined to pass validation.

Returning to step 608, if it is determined that the overall autonomy/teleoperations system is not validated, then the overall autonomy/teleoperations system is determined to not pass validation at step 612, and the method 600 of assessing readiness is completed. The reasons why the overall autonomy/teleoperations system may not pass validation may vary widely. For example, the overall autonomy/teleoperations system may not pass validation even if a behavioral reaction is appropriate in the event that certain other behavioral reactions are preferred. For example, the ODDs may be inappropriate for an intervention of the teleoperations system, or visual displays may be insufficient, or latency of a wireless connection with the teleoperations system is insufficient, etc.

Referring back to step 606, if it is determined that the behavioral reaction is not appropriate, then the method 600 proceeds to step 612 in which the overall system does not pass validation. In some instances, an inappropriate behavioral reaction may indicate that a teleoperations system operated by a human driver may be insufficient to compensate for potential negative events experienced by an autonomy system.

Figure 7:
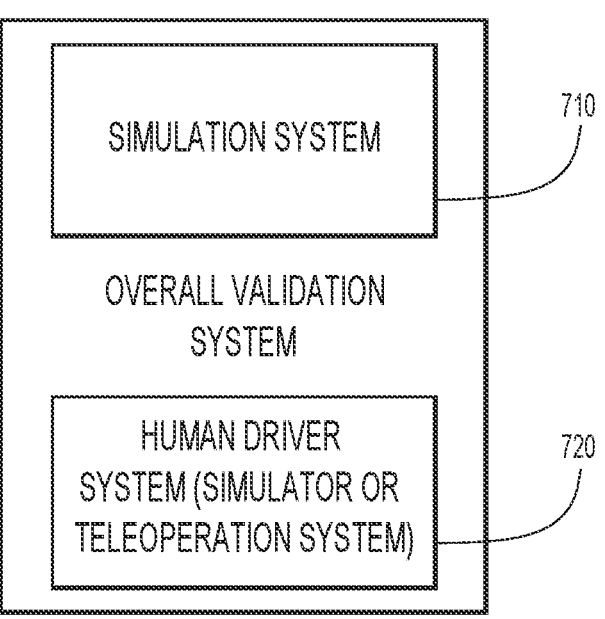
FIG. 7 is a block diagram illustrating an overall validation system that includes a simulation system and a human driver system, according to an example embodiment.

FIG. 7 is a block diagram representation of an overall validation system 700 that includes a simulation system 710 and a human driver system 720 in accordance with an example embodiment. The overall validation system 700 may be substantially validated to determine whether an autonomous vehicle may be safely deployed.

The simulation system 710 may generally be a computer system, as for example a hardware system on which software may run, which simulates an autonomy system that is to be deployed on a vehicle. In one embodiment, simulation system 710 may be a distributed system and/or a cloud computing system. Simulation system 710 may be arranged to simulate driving a vehicle on-road, and may include real world scenes, e.g., simulated situations based on real-world roads and situations. In general, simulation system 710 is configured to simulate driving a vehicle controlled by an autonomy system that is to be assessed.

The human driver system 720 may include a teleoperations system that allows a human driver to operate an actual vehicle remotely, and/or a system, which enables the human driver to drive in simulation. In one embodiment, human driver system 720 may be used to allow a remote human driver to monitor a vehicle that is currently being driven in autonomous mode, and to substantially take over control of the vehicle as needed, e.g., to avoid a collision.

As mentioned above, an autonomous vehicle may operate autonomously substantially under the control of an autonomy system, and may also be operated using a teleoperations system, e.g., a teleoperations system operated by a human or remote operator. For example, if an autonomy system on a vehicle determines that the autonomy system may not be operated safely in autonomy due to an obstacle, a teleoperations system may effectively take over control of the vehicle to navigate the vehicle around and/or past the obstacle.

Figure 8:
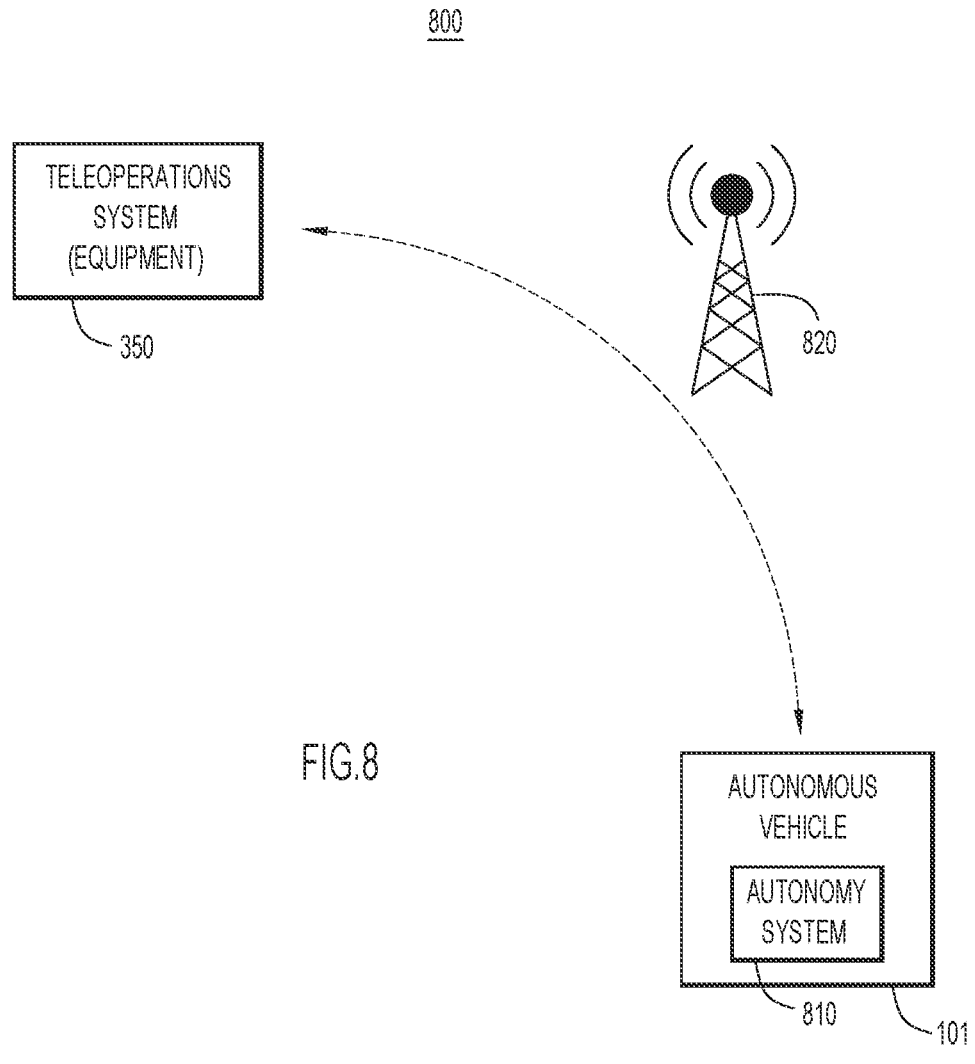
FIG. 8 is a diagram of an overall vehicle framework that includes an autonomous vehicle and a teleoperations system, according to an example embodiment.

FIG. 8 is a diagram illustrating an overall vehicle framework 800 that includes the autonomous vehicle 101 of FIGS. 1-3, and a teleoperations system 350 of FIG. 3, according to an example embodiment. The overall vehicle framework 800 includes at least one autonomous vehicle 101 and at least one teleoperations system 350. It should be appreciated that overall vehicle framework 800 may generally include a fleet of autonomous vehicles 101, e.g., fleet 100 of FIG. 1. The teleoperations system 350 may be configured to control, e.g., remotely operate, at least one autonomous vehicle 101. In one embodiment, autonomous vehicle 101 is an autonomous vehicle, which includes an autonomy system 810 that is configured to allow autonomous vehicle 101 to operate in an autonomous manner.

The teleoperations system 350 generally includes equipment that allows a remote operator, e.g., a human driver, to operate autonomous vehicle 101 over a network 820. Such equipment may include, but is not limited to, communication/processing equipment and a human operator station that may be arranged similarly to a driver configuration or station in a typical automobile. A human operator system may include for example, a driver seat, a steering wheel, pedals such as acceleration and brake pedals, a gear shifter, and controls such as directional signal controls. The teleoperations system 350 may also include a visual interface, configured to allow a human operator to view the environment in which autonomous vehicle 101 that is to be driven or otherwise controlled by teleoperations system 350 is operating. The visual interface may include, but is not limited to, a display screen, a virtual-reality (VR) headset, and/or ab augmented-reality (AR) headset.

The network 820 may generally be any communications network(s). In one embodiment, the network 820 may be a cellular network such as a 3G/4G/5G network and/or an LTE network. In general, data may be provided from teleoperations system 350 to autonomous vehicle 101 through the network, 820, and from autonomous vehicle 101 to teleoperations system 350 through the network 820.

According to one or more example embodiments, the teleoperations system 350 assists the autonomy system 810 to meet the minimum deployment standard. The teleoperations system 350 is utilized or involved in limited or restrictive circumstances in which it performs better than the autonomy system 810 to improve the overall MPNE value to be comparable if not better than a human in the car driver.

In one example embodiment, the simulation data may be split into various scenes and grouped into categories and/or types, as described in U.S. patent application Ser. No. 17/331,051, filed on May 26, 2021, entitled "METHODS AND APPARATUS FOR USING SCENE-BASED METRICS TO GATE READINESS OF AUTONOMOUS SYSTEMS," which is incorporated herein by reference. The teleoperations system 350 is then tested for complex scenes of various categories and/or types, reducing amount of teleoperations simulation data needed for validation. That is, the data obtained for the complex scenes is representative for the respective scenario category. The data may include a combination of Operational Design Domain (ODD) and an Object and Event Detection and Response (OEDR), such as a right turn at an unprotected intersection, pedestrian encountered, and the maneuver performed or behavior of the teleoperations system 350. ODDs may include four types of intersections and not an intersection. The OEDR may include agents such as a tailgater car, a pedestrian, a car in front, motorcycles, etc., and may include responses such as going right, left, straight, and stopping.

In yet another example embodiment, the negative events may be grouped into categories such as collision type category, bad behavior category such as jumping a curb, and breaking a traffic law category. The processes described above may then be executed specific for each category of negative events yielding a category specific validation value.

Additionally, different categories may be assigned different weights to assess the overall autonomy/teleoperations system readiness.

Reference is now made to FIG. 9 that shows a flow chart depicting a method 900 of determining whether an autonomous driving system in conjunction with a teleoperations driving system meets a minimum deployment standard, according to an example embodiment. The method 900 may be performed by an overall system 450 of FIG. 4B and/or the overall validation system 700 of FIG. 7.

The method 900 begins at step 910, in which a computing device obtains simulation data of an autonomous driving system of a vehicle. The simulation data includes first environment data representing an environment in which the vehicle is driven using the autonomous driving system.

At step 920, the computing device obtains teleoperations driving data of a teleoperations driving system in which the vehicle is remotely controlled with an aid of a human. The teleoperations driving data includes second environment data representing the environment in which the vehicle is driven using the teleoperations driving system.

At step 930, the computing device determines whether the autonomous driving system in conjunction with the teleoperations driving system meets a minimum deployment standard based on the simulation data and the teleoperations driving data.

In one form, the method 900 may further involve deploying an autonomous vehicle having the autonomous driving system in conjunction with the teleoperations driving system based on determining that the autonomous driving system in conjunction with the teleoperations driving system meets the minimum deployment standard.

Moreover, the method 900 may further involve extracting from the simulation data a plurality of disengagement points. Each disengagement point may represent a time interval or a scene in which the autonomous driving system failed or was disengaged to avoid an event. Additionally, the step 930 of determining whether the autonomous driving system in conjunction with the teleoperations driving system meets the minimum deployment standard may include assessing whether the autonomous driving system in conjunction with the teleoperations driving system taking control of the vehicle at the plurality of disengagements points, meets the minimum deployment standard.

In one instance, the method 900 may further involve analyzing the simulation data and the teleoperations driving data to determine: (a) a situational awareness of the teleoperations driving system in which the teleoperations driving system detects a situation in which the autonomous driving system disengages and (b) a corresponding behavioral reaction of the teleoperations driving system to the situation in which the teleoperations driving system performs a targeted response to the situation. Additionally, the step 930 of determining whether the autonomous driving system in conjunction with the teleoperations driving system meets the minimum deployment standard may be based on the corresponding behavioral reaction of the teleoperations driving system.

According to one or more example embodiments, the step 930 of determining whether the autonomous driving system in conjunction with the teleoperations driving system meets the minimum deployment standard may include combining the simulation data with the teleoperations driving data in a statistical inference manner to generate a MPNE value of the autonomous driving system in conjunction with the teleoperations driving system and determining whether the MPNE value is equal to or above the minimum deployment standard.

Additionally, the method 900 may further involve extracting a plurality of disengagement points from the simulation data. Each of the plurality of disengagement points is a time interval or a scene in which the autonomous driving system failed or was disengaged to avoid an event. The method 900 may further involve grouping the plurality of disengagement points into a plurality of scenario categories. The teleoperations driving data may include performance of the teleoperations driving system in a complex scene for each of the plurality of the scenario categories.

In one form, the method 900 may involve a computing device determining, based on the simulation data, an amount of the teleoperations driving data needed to validate the autonomous driving system in conjunction with the teleoperations driving system.

In one instance, the method 900 may involve determining, based on the simulation data, whether the autonomous driving system alone meets the minimum deployment standard and based on determining that the autonomous driving system alone does not meet the minimum deployment standard, perform the following operations: (a) calculate a combined MPNE value of the autonomous driving system in conjunction with the teleoperations driving system based on the simulation data and the teleoperations driving data and (b) compare the combined MPNE value with the minimum deployment standard associated with a MPNE of a human driver.

It should be understood that the disclosure may be embodied in many other specific forms without departing from the spirit or the scope of the present disclosure. By way of example, a predetermined safety standard or a predetermined safety threshold may vary widely. Such a standard or threshold may also be measured using any suitable metric. Suitable metrics include, but are not limited to including, MPNE, a number of negative events per disengaged scene, a number of critical disengages, an average number of miles per disengagement, etc.

The number of miles driven or, more generally, the distances driven using a teleoperations system to substantially validate that an autonomy system backed up by the teleoperations system effectively meets a predetermined safety standard or threshold may vary widely. The distances driven by a teleoperator may be determined based on factors including, but not limited to, a number of simulated miles that is to be validated, the types of scenes included in the distances driven, an acceptable risk level, confidence levels, and/or machine learning algorithms used to calculate distances to be driven.

For any public roads deployment activity, safety thresholds may vary widely. For example, safety thresholds may be set as a function of acceptable probability of occurrence of negative events (safety) events in the given miles of exposure, and therefore on failure rate or MPNE. In one embodiment, acceptable thresholds may be defined based on an acceptable risk appetite and an acceptable risk of injuries.

In one embodiment, a single application or tool may be used to provide autonomy system simulation capabilities, driver simulation capabilities, and/or teleoperations capabilities. It should be appreciated, however, the separate applications or tools may be used to provide simulation and teleoperations capabilities.

An autonomous vehicle has generally been described as a land vehicle, or a vehicle that is arranged to be propelled or conveyed on land. It should be appreciated that in some embodiments, an autonomous vehicle may be configured for water travel, hover travel, and or/air travel without departing from the spirit or the scope of the present disclosure. In general, an autonomous vehicle may be any suitable transport apparatus that may operate in an unmanned, driverless, self-driving, self-directed, and/or computer-controlled manner.

The embodiments may be implemented as hardware, firmware, and/or software logic embodied in a tangible, i.e., non-transitory, medium that, when executed, is operable to perform the various methods and processes described above. That is, the logic may be embodied as physical arrangements, modules, or components. For example, the systems of an autonomous vehicle, as described above with respect to FIG. 3, may include hardware, firmware, and/or software embodied on a tangible medium. A tangible medium may be substantially any computer-readable medium that is capable of storing logic or computer program code which may be executed, e.g., by a processor or an overall computing system, to perform methods and functions associated with the embodiments. Such computer-readable mediums may include, but are not limited to including, physical storage and/or memory devices. Executable logic may include, but is not limited to including, code devices, computer program code, and/or executable computer commands or instructions.

It should be appreciated that a computer-readable medium, or a machine-readable medium, may include transitory embodiments and/or non-transitory embodiments, e.g., signals or signals embodied in carrier waves. That is, a computer-readable medium may be associated with non-transitory tangible media and transitory propagating signals.

Figure 10:
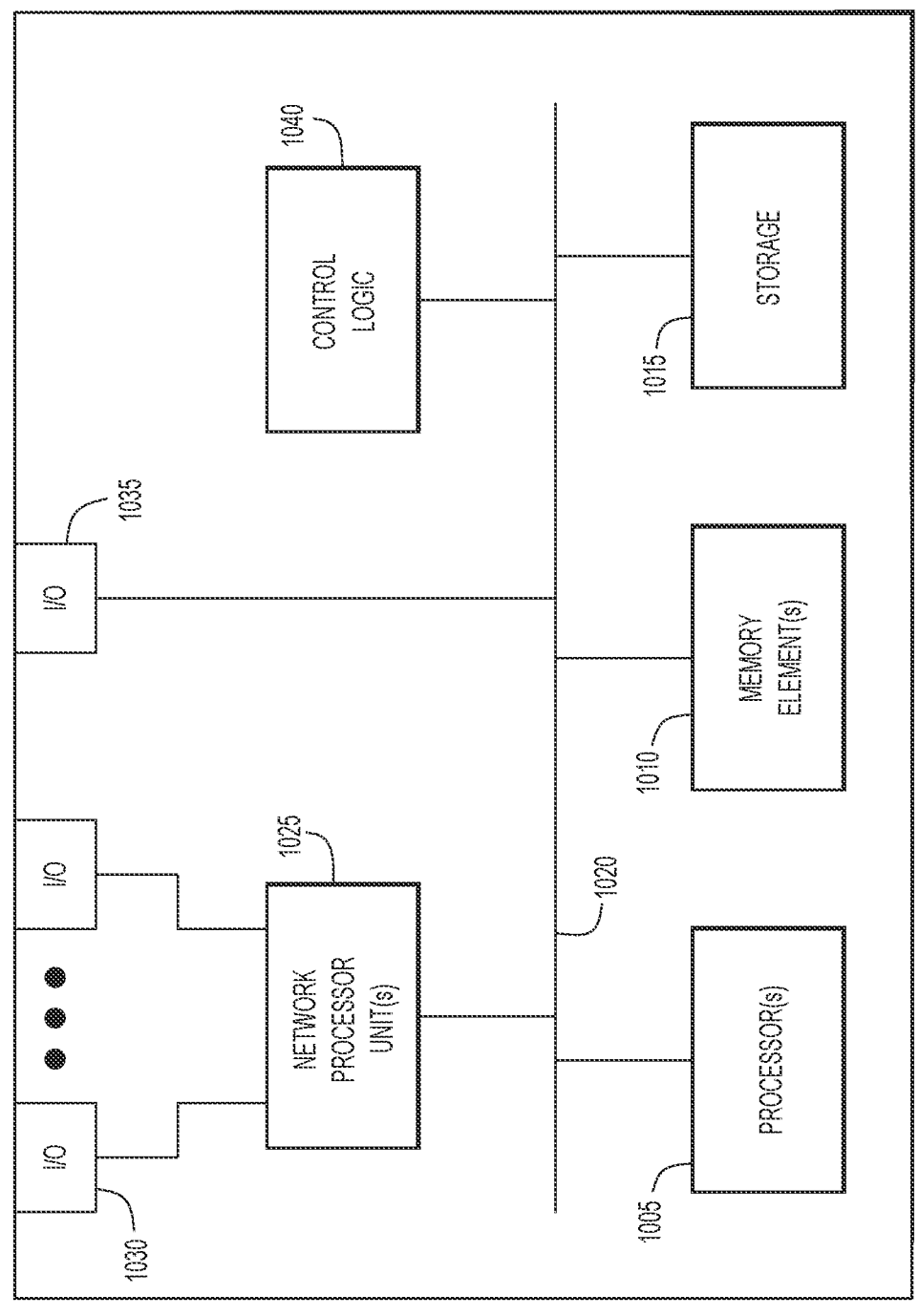
FIG. 10 is a block diagram of a computing device configured to perform functions associated with the techniques described herein, according to one or more example embodiments.

Referring now to FIG. 10, FIG. 10 illustrates a hardware block diagram of a computing device 1000 that may perform the operations of the teleoperations system 350 of FIGS. 3 and 8, the decision analysis system 360 of FIG. 3, the framework system 400 of FIG. 4A, the overall system 450 of FIG. 4B, the overall validation system 700 of FIG. 7, and the operations described herein in connection with the techniques depicted in FIGS. 1-9.

In various example embodiments, a computing device, such as computing device 1000 or any combination of computing devices, may be configured as any entity/entities as discussed for the techniques depicted in connection with FIGS. 1-9 in order to perform operations of the various techniques discussed herein.

In at least one embodiment, computing device 1000 may include one or more processor(s) 1005, one or more memory element(s) 1010, storage 1015, a bus 1020, one or more network processor unit(s) 1025 interconnected with one or more network input/output (I/O) interface(s) 1030, one or more I/O interface(s) 1035, and control logic 1040. In various embodiments, instructions associated with logic for computing device 1000 can overlap in any manner and are not limited to the specific allocation of instructions and/or operations described herein.

In at least one embodiment, processor(s) 1005 is/are at least one hardware processor configured to execute various tasks, operations and/or functions for computing device 1000 as described herein according to software and/or instructions configured for computing device. Processor(s) 1005 (e.g., a hardware processor) can execute any type of instructions associated with data to achieve the operations detailed herein. In one example, processor(s) 1005 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term "processor."

In at least one embodiment, memory element(s) 1010 and/or storage 1015 is/are configured to store data, information, software, and/or instructions associated with computing device 1000, and/or logic configured for memory element(s) 1010 and/or storage 1015. For example, any logic described herein (e.g., control logic 1040) can, in various embodiments, be stored for computing device 1000 using any combination of memory element(s) 1010 and/or storage 1015. Note that in some embodiments, storage 1015 can be consolidated with memory element(s) 1010 (or vice versa), or can overlap/exist in any other suitable manner.

In at least one embodiment, bus 1020 can be configured as an interface that enables one or more elements of computing device 1000 to communicate in order to exchange information and/or data. Bus 1020 can be implemented with any architecture designed for passing control, data and/or information between processors, memory elements/storage, peripheral devices, and/or any other hardware and/or software components that may be configured for computing device 1000. In at least one embodiment, bus 1020 may be implemented as a fast kernel-hosted interconnect, potentially using shared memory between processes (e.g., logic), which can enable efficient communication paths between the processes.

In various embodiments, network processor unit(s) 1025 may enable communication between computing device 1000 and other systems, entities, etc., via network I/O interface(s) 1030 to facilitate operations discussed for various embodiments described herein. In various embodiments, network processor unit(s) 1025 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 1000 and other systems, entities, etc. to facilitate operations for various embodiments described herein. In various embodiments, network I/O interface(s) 1030 can be configured as one or more Ethernet port(s), Fibre Channel ports, and/or any other I/O port(s) now known or hereafter developed. Thus, the network processor unit(s) 1025 and/or network I/O interfaces 1030 may include suitable interfaces for receiving, transmitting, and/or otherwise communicating data and/or information in a network environment.

I/O interface(s) 1035 allow for input and output of data and/or information with other entities that may be connected to the computing device 1000. For example, I/O interface(s) 1035 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 1040 can include instructions that, when executed, cause processor(s) 1005 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 1040) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or nonvolatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term "memory element." Data/information being tracked and/or sent to one or more entities as discussed herein could be provided in any database, table, register, list, cache, storage, and/or storage structure: all of which can be referenced at any suitable timeframe. Any such storage options may also be included within the broad term "memory element" as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software (potentially inclusive of object code and source code), etc.) for execution by one or more processor(s), and/or other similar machine, etc. Generally, memory element(s) 1010 and/or storage 1015 can store data, software, code, instructions (e.g., processor instructions), logic, parameters, combinations thereof, and/or the like used for operations described herein. This includes memory element(s) 1010 and/or storage 1015 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In summary, in one form, an apparatus is provided that includes a memory, a network interface configured to enable network communications, and a processor. The processor is configured to perform operations involving obtaining simulation data of an autonomous driving system of a vehicle. The simulation data includes first environment data representing an environment in which the vehicle is driven using the autonomous driving system. The operations further involve obtaining teleoperations driving data of a teleoperations driving system in which the vehicle is remotely controlled with an aid of a human. The teleoperations driving data includes second environment data representing the environment in which the vehicle is driven using the teleoperations driving system. The operations further involve determining whether the autonomous driving system in conjunction with the teleoperations driving system meets a minimum deployment standard based on the simulation data and the teleoperations driving data.

In another form, one or more non-transitory computer readable storage media are provided encoded with instructions that, when executed by at least one processor, are operable to perform operations including: obtaining simulation data of an autonomous driving system of a vehicle. The simulation data includes first environment data representing an environment in which the vehicle is driven using the autonomous driving system. The operations further include obtaining teleoperations driving data of a teleoperations driving system in which the vehicle is remotely controlled with an aid of a human. The teleoperations driving data includes second environment data representing the environment in which the vehicle is driven using the teleoperations driving system. The operations further include determining whether the autonomous driving system in conjunction with the teleoperations driving system meets a minimum deployment standard based on the simulation data and the teleoperations driving data.

In yet another form, a system is provided that includes the devices, systems, and operations explained above with reference to FIGS. 1-10.

The steps associated with the methods of the present disclosure may vary widely. Steps may be added, removed, altered, combined, and reordered without departing from the spirit of the scope of the present disclosure. Therefore, the present examples are to be considered as illustrative and not restrictive, and the examples are not to be limited to the details given herein, but may be modified within the scope of the appended claims.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
   obtaining, by a computing device, simulation data of an autonomous driving system of a vehicle, the simulation data including first environment data representing an environment in which the vehicle is driven using the autonomous driving system;
   obtaining, by the computing device, teleoperations driving data of a teleoperations driving system in which the vehicle is remotely controlled with an aid of a human, the teleoperations driving data including second environment data representing the environment in which the vehicle is driven using the teleoperations driving system; and
   determining, by the computing device, whether to deploy the autonomous driving system alone or in conjunction with the teleoperations driving system based on the simulation data and the teleoperations driving data.

2. The method of claim 1, further comprising:
   deploying an autonomous vehicle having the autonomous driving system in conjunction with the teleoperations driving system based on determining that the autonomous driving system alone does not meet a minimum deployment standard.

3. The method of claim 1, further comprising:
   extracting, from the simulation data, a time interval or scene in which the autonomous driving system failed or was disengaged to avoid an event; and
   determining whether the autonomous driving system in conjunction with the teleoperations driving system avoids the event in the time interval or scene.

4. The method of claim 1, further comprising:
   deploying an autonomous vehicle having the autonomous driving system in conjunction with the teleoperations driving system based on determining that the autonomous driving system in conjunction with the teleoperations driving system meets a minimum deployment standard.

5. The method of claim 1, further comprising:
   analyzing the simulation data and the teleoperations driving data to determine:

a situational awareness of the teleoperations driving system in which the teleoperations driving system detects a situation in which the autonomous driving system disengages, and
a corresponding behavioral reaction of the teleoperations driving system to the situation in which the teleoperations driving system performs a targeted response to the situation,
wherein determining whether to deploy the autonomous driving system alone or in conjunction with the teleoperations driving system is based on the corresponding behavioral reaction of the teleoperations driving system.

6. The method of claim 1, further comprising:
   generating a miles per negative event (MPNE) value for the autonomous driving system based on the simulation data,
   wherein determining whether to deploy the autonomous driving system alone is based on the MPNE value.

7. The method of claim 6, further comprising:
   generating another MPNE value for the autonomous driving system in conjunction with the teleoperations driving system based on the simulation data and the teleoperations driving data,
   wherein determining to deploy the autonomous driving system in conjunction with the teleoperations driving system is based on the another MPNE value.

8. The method of claim 1, wherein determining whether to deploy the autonomous driving system in conjunction with the teleoperations driving system includes:
   combining the simulation data with the teleoperations driving data in a statistical inference manner to generate a miles per negative event (MPNE) value of the autonomous driving system in conjunction with the teleoperations driving system; and
   determining whether the MPNE value is equal to or above a minimum deployment standard.

9. The method of claim 1, further comprising:
   extracting a plurality of disengagement points from the simulation data, each of the plurality of disengagement points is a time interval or a scene in which the autonomous driving system failed or was disengaged to avoid an event; and
   grouping the plurality of disengagement points into a plurality of scenario categories,
   wherein the teleoperations driving data includes performance of the teleoperations driving system in a complex scene for each of the plurality of scenario categories.

10. The method of claim 1, further comprising:
   determining, by the computing device, based on the simulation data, an amount of the teleoperations driving data needed to validate the autonomous driving system in conjunction with the teleoperations driving system.

11. The method of claim 1, wherein determining whether to deploy the autonomous driving system alone or in conjunction with the teleoperations driving system includes:
   determining, based on the simulation data, whether to deploy the autonomous driving system alone; and
   based on determining not to deploy the autonomous driving system alone:
      calculating a combined miles per negative event (MPNE) value of the autonomous driving system in conjunction with the teleoperations driving system based on the simulation data and the teleoperations driving data, and comparing the combined MPNE value with an MPNE of a human driver.

12. An apparatus comprising:

a memory;

a network interface configured to enable network communications; and a processor, wherein the processor is configured to perform operations comprising:

obtaining simulation data of an autonomous driving system of a vehicle, the simulation data including first environment data representing an environment in which the vehicle is driven using the autonomous driving system;

obtaining teleoperations driving data of a teleoperations driving system in which the vehicle is remotely controlled with an aid of a human, the teleoperations driving data including second environment data representing the environment in which the vehicle is driven using the teleoperations driving system; and determining whether to deploy the autonomous driving system alone or in conjunction with the teleoperations driving system based on the simulation data and the teleoperations driving data.

13. The apparatus of claim 12, wherein the processor is further configured to perform:

control operations to deploy an autonomous vehicle having the autonomous driving system in conjunction with the teleoperations driving system based on determining that the autonomous driving system alone does not meet a minimum deployment standard.

14. The apparatus of claim 12, wherein the processor is further configured to perform:

extracting, from the simulation data, a time interval or scene in which the autonomous driving system failed or was disengaged to avoid an event; and determining whether the autonomous driving system in conjunction with the teleoperations driving system avoids the event in the time interval or scene.

15. The apparatus of claim 12, wherein the processor is further configured to perform:

control operations to deploy an autonomous vehicle having the autonomous driving system in conjunction with the teleoperations driving system based on determining that the autonomous driving system in conjunction with the teleoperations driving system meets a minimum deployment standard.

16. The apparatus of claim 12, wherein the processor is further configured to perform:

analyzing the simulation data and the teleoperations driving data to determine:

a situational awareness of the teleoperations driving system in which the teleoperations driving system detects a situation in which the autonomous driving system disengages, and a corresponding behavioral reaction of the teleoperations driving system to the situation in which the teleoperations driving system performs a targeted response to the situation, wherein determining whether to deploy the autonomous driving system alone or in conjunction with the teleoperations driving system is based on the corresponding behavioral reaction of the teleoperations driving system.

17. The apparatus of claim 12, wherein the processor is further configured to perform:

generating a miles per negative event (MPNE) value for the autonomous driving system based on the simulation data, wherein determining whether to deploy the autonomous driving system alone is based on the MPNE value.

18. One or more non-transitory computer readable storage media encoded with instructions that, when executed by a processor, cause the processor to execute a method comprising:

obtaining simulation data of an autonomous driving system of a vehicle, the simulation data including first environment data representing an environment in which the vehicle is driven using the autonomous driving system;

obtaining teleoperations driving data of a teleoperations driving system in which the vehicle is remotely controlled with an aid of a human, the teleoperations driving data including second environment data representing the environment in which the vehicle is driven using the teleoperations driving system; and determining whether to deploy the autonomous driving system alone or in conjunction with the teleoperations driving system based on the simulation data and the teleoperations driving data.

19. The one or more non-transitory computer readable storage media of claim 18, wherein the method further comprises:

control operations to deploy an autonomous vehicle having the autonomous driving system in conjunction with the teleoperations driving system based on determining that the autonomous driving system alone does not meet a minimum deployment standard.

20. The one or more non-transitory computer readable storage media of claim 18, wherein the method further comprises:

extracting, from the simulation data, a time interval or scene in which the autonomous driving system failed or was disengaged to avoid an event; and determining whether the autonomous driving system in conjunction with the teleoperations driving system avoids the event in the time interval or scene.

* * * * *